United States Patent Office  3,098,226
Patented July 16, 1963

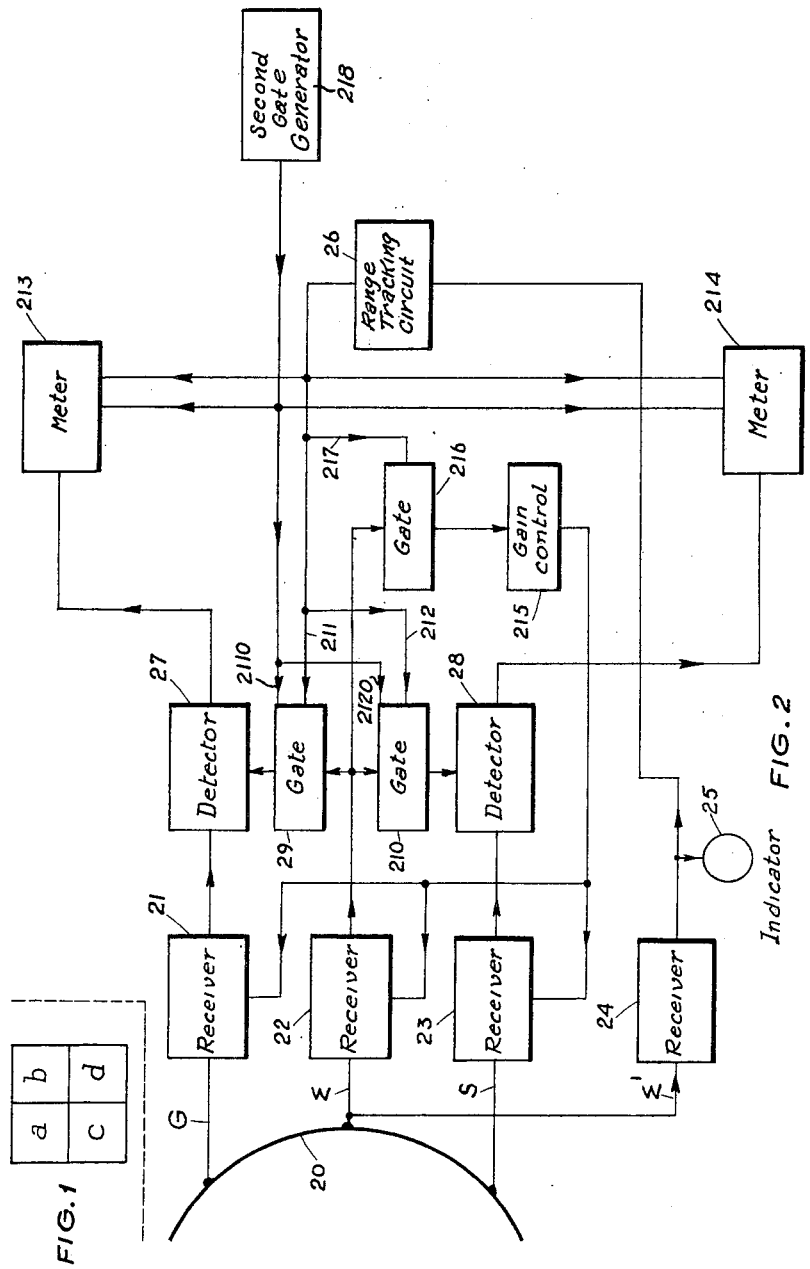

3,098,226
TARGET TRACKING SYSTEMS
Guy Révillon, Paris, France, assignor to Compagnie Generale de Telegraphie Sans Fil, a corporation of France
Filed Mar. 16, 1959, Ser. No. 799,515
Claims priority, application France Mar. 20, 1958
5 Claims. (Cl. 343—16)

The present invention relates to radar systems of the type providing error signals which indicate the deviation of the in azimuth and in elevation with respect to the pointing direction of the radar system. It relates more particularly to monopulse radar systems.

It is an object of the present invention to provide a system for improving the accuracy of the received error signals, even though such signals might be affected by jamming or interference.

It is well known that in conventional radars of the above type, automatic tracking may be seriously affected by interfering signals which are superposed upon the desired signals during the time interval when the reception circuits are actuated by target bound gate signals.

According to the invention, in order to eliminate the disturbing action of jamming and other interference signals, a second gate signal is provided, which actuates the receiver circuits, for example, immediately before the transmisson of each radar pulse.

The amplitudes of the signals received, measured during the respective period of actuation of the receiver by the two signals, are then subtracted from each other, the disturbing action of the interfering signal being thus eliminated. This operation is repeated for every transmitted radar pulse.

Thus a receiver arrangement for automatic target tracking, monopulse radar systems comprises, according to the invention, a detector for providing error signals indicative of the angular deviation of the target with respect to the pointing direction of said radar system, means for locally providing a first target bound gate signal and a second gate-signal in fixed time relationship with the pulses transmitted by the radar system, means for controlling the operation of said detector by means of said first and second gate signals and a subtractor device for subtracting from each other said error signals provided by said detector upon respective operation thereof by said first and second gate signals.

The invention will be best understood from the following description and appended drawings, wherein:

FIG. 1 illustrates, very diagrammatically, the arrangements of the primary sources of a monopulse radar;

FIG. 2 is a block diagram of a monopulse radar wherein a system according to the invention has been incorporated;

Figure 3:
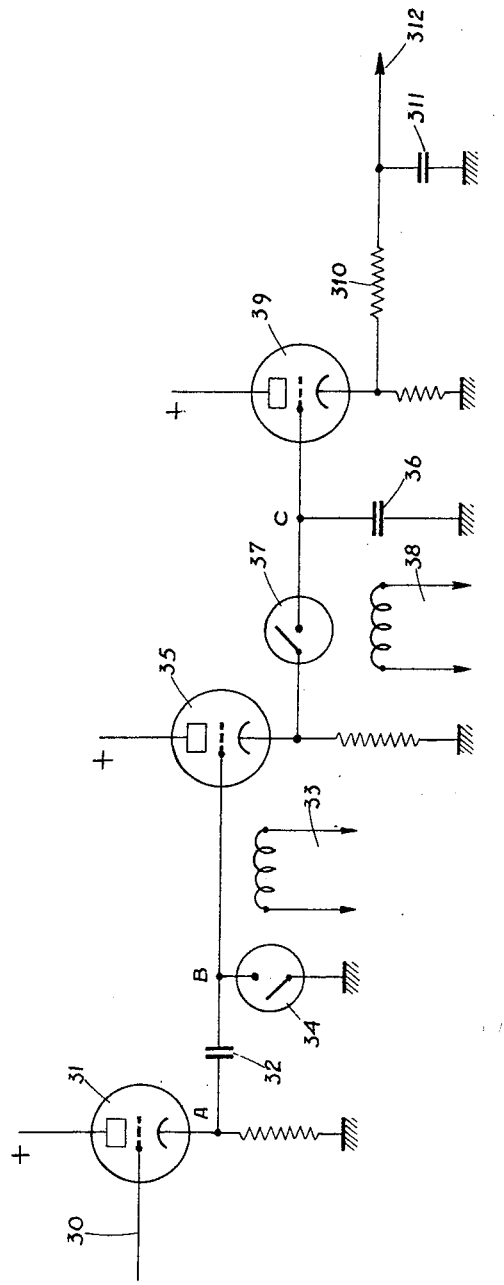
FIG. 3 is a schematic wiring diagram of a system according to the invention.

As is well known, in monopulse radar systems the parabolic reflector is generally illuminated by four primary sources which are arranged in its focal zone and are schematically illustrated at $a$, $b$, $c$ and $d$, in FIG. 1. The four sources are supplied in phase and provide a single radiation pattern which is symmetric with respect to the axis of the aerial.

In the receiver, which is very diagrammatically shown in FIG. 2, echo signals A, B, C and D, respectively corresponding to the four sources $a$, $b$, $c$ and $d$ and which are received by aerial 20, are, as is well known in the art, combined in such a manner as to provide in a "sum" or reference channel $\Sigma$ a "sum" signal $(A+B+C+D)$, in a "difference" channel G a "difference" signal $(A+B)-(C+D)$ which provides by comparison with the sum channel an elevation error signal and in another "difference" channel S a 'difference' signal $(A+C)-(B+D)$ which provides in the same way an azimuth error signal. By "error signal" is meant a signal which indicates the angle by which the pointing direction is off the actual target direction i.e. the deviation angle in azimuth and in elevation of the target direction with respect to the pointing direction of the radar system.

The necessary additions and subtractions are generally effected by means of hybrid junctions.

A fourth channel $\Sigma'$, which is in parallel with the sum-channel, receives the four echo signals A, B, C and D.

It is entirely conventional and comprises an indicator 25, on which all the echoes and other signals collected by the radar antenna are displayed, and range tracking circuits 26 which provide a window or gate signal for distance tracking of the target. In the course of the description which follows, particular reference will be made to this latter signal, which for the sake of clarity and for a reason which will become apparent hereinafter will be termed the "first" gate signal.

Referring again to channels $\Sigma$, G and S, they comprise respective receivers 22, 21 and 23, channels G and S comprising in addition respective phase detectors 27 and 28. The reference signal is fed to these detectors by the sum channel through respective gates 29 and 210 which are triggered or actuated at 211 and 212 respectively by the range tracking circuit 26. In this manner, as is well known in the art, only the information relating to the echo reflected by the tracked target will appear at the output of detectors 27 and 28.

This information is in the shape of video frequency pulses, the amplitude of which is a function of the angle by which the pointing direction is off the desired direction and the polarity of which is a function of the phase, i.e. of the direction of this deviation angle with respect to the axis of symmetry of the radar aerial. Thus, error signals are obtained which make, by means of suitable and well known servo-system, the directive tracking of the target possible.

With a view towards completing this diagrammatic description of the known tracking circuits, an automatic gain control device 215 has been illustrated, which is fed by the sum channel through a gate 216, which is controlled at 217 by the first, i.e. the target bound gate signal. This device simultaneously controls the gain of receivers 21, 22 and 23.

The arrangement described does, however, not operate satisfactorily in the presence of a frequency modulated interference whose modulation period is small with respect to the radar pulse duration.

Automatic direction tracking is all the more affected by interference as the interfering signal period is shorter, since the jammer behaves in fact as a target which is angularly shifted with respect to the pointing direction and consequently tends to adulterate the error signals delivered by the radar system. In fact jamming signals are superimposed at the detector output on the desired echo signals, resulting in considerable disturbance of the tracking system operation.

It is an object of the invention to eliminate this drawback and to make a successful and accurate tracking possible in spite of any interference or jamming.

A device according to the invention is arranged for actuating channels G and S, each time a pulse is radiated, once by means of the target bound gate signal, termed hereinabove "first" gate, in the same way as in conventional target tracking radar systems, and once by means of a second gate signal. The first gate signal provides a pulse sample due to the simultaneous presence of the desired echo signal and of the interference signal. The second gate signal provides a voltage sample due only to the interference signal. The second sample is then subtracted from the first one and this operation is repeated each time a pulse is transmitted, the actual angular deviation of the radar system from the desired tracking direction being proportionate to the average voltage obtained.

According to the invention, the following circuit elements are incorporated in the otherwise known circuit of FIG. 2.

The release of the second gate signal is controlled, for example, by the conventional synchronizer of the radar system. This signal is delivered, for example, immediately before the radar pulse signal is transmitted.

Figure 4:
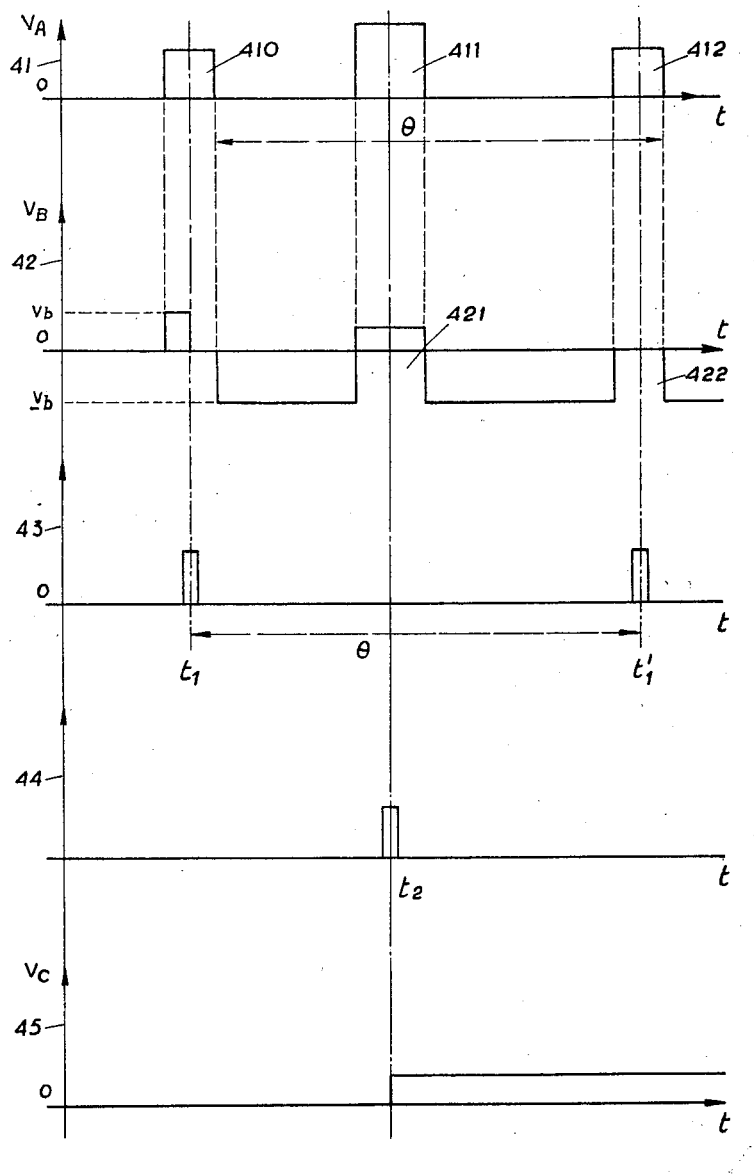
FIG. 4 is a diagram explaining the operation of the system of FIG. 3.

This signal is applied at 218 and controls gates 29 and 210, by connection means 2110 and 2120, thus making the provision of the corresponding samples possible. Meter circuits 213 and 214 are respectively coupled to the outputs of detectors 27 and 28. These two meters operating exactly in the same manner, only one of them, namely meter 213, associated with detector 27 of channel G, will be described with reference to FIG. 3. The various voltages appearing at different points of this device are plotted as a function of time on diagrams 41, 42, 43, 44 and 45 of FIG. 4.

The operation is as follows:

The video frequency pulses at the output of detector 27, which are allowed to pass as pulse samples due to the operation of gate 29, are caused, in any known manner, to assume the shape of rectangular pulses 410 and the two gate signals shown in diagrams 43 and 44 are delayed, also in any known manner, to coincide with the central portion of the pulse shown in diagram 41.

Among the pulse samples shown in diagram 41, sample 410 is that obtained when the second gate signal actuates gate 29. Accordingly, it is the signal indicating the angular shift of the jammer with respect to the pointing direction, which signal is by and in itself an undesired signal. Sample 411 is that obtained when gate 29 is operated by the first gate signal and its amplitude corresponds to the sum of the signals corresponding to the respective angular deviations from the pointing direction of both the jammer and the target.

Sample 412 is similar to sample 410, time $\theta$ representing the recurrence period of the radar pulses.

Pulses appearing at the output of detector 27 are applied at 30 to the grid of a cathode follower tube 31 to appear at a point A on the cathode of the tube. The voltage at B takes a value $V_b$ as shown in diagram 42. At an instant $t_1$, i.e. the instant substantially corresponding to the middle of pulse 410, the second gate signal actuates a relay 33 which closes contact 34, thus grounding point B during a very short time, resulting in the charging of condenser 32 and the cancelling of the potential at B up to the end of sample 410. At this instant, voltage $V_a$ becomes zero and a voltage $-V_b$ appears at B.

Upon sample's 411 reaching the grid of tube 31, a pulsed voltage 421 appears at B, whose positive amplitude is equal to that of pulse 411 minus voltage $V_b$, as shown in diagram 42. Thus the zero level of pulse 421 depends on the value of $-V_b$ and this zero level may be termed a "floating" zero level.

The result is that, each time a pulse 411 appears at the output of detector 27, its amplitude with respect to ground is a measure of the angular deviation of the target with respect to the pointing axis, the amplitude of this voltage being the difference between the respective amplitudes of pulses 411 and 410.

This differential voltage is applied to the grid of a cathode follower tube 35 which charges a condenser 36, through a contactor 37, which is closed for a very short duration by a relay 38 which is actuated at instant $t_2$ by the first gate pulse. Condenser 36 is thus charged to voltage $V_c$, shown in diagram 45, which voltage is the correct error voltage. This voltage is applied to the grid of another cathode follower 39, the cathode of which is connected to a circuit comprising a resistance 310 and a capacitor 311. The voltage colleced at the output 312 of this circuit provides an average indication of the azimuth deviation of the target.

Of course, the invention is in no way limited by the embodiments described and illustrated, which were given only by way of example.

What is claimed is:

1. A receiver arrangement system for an automatic target tracking, monopulse radar system, including means for receiving signal echoes of radar pulses, comprising: detectors for providing error signals indicative of the angular deviation of said target with respect to the pointing direction of said radar system; reference channel means for locally providing a first, target bound gate signal; means for locally providing a second gate signal in fixed time relationship with said radar pulses; gate means controlling the operation of said detector; first means for actuating said gate means upon provision of said first gate signal; second means for actuating said gate means upon provision of said second gate signal; and means for subtracting from the error signal, provided upon actuation of said gate means by said first gate signal, the error signal provided upon actuation of said gate means by said second gate signal.

2. A receiver arrangement system for automatic target tracking monopulse radar systems, including means for receiving echoes of radar pulses, comprising: detector means for providing error signals indicative of the angular deviation of said target with respect to the pointing direction of said radar system; a reference channel locally providing a first, target bound local gate signal; means for locally providing a second local gate signal in fixed time relationship with said radar pulses; means for making said detector means operative upon provision of said second gate signal to provide a first signal; means for storing said first signal with a reversed polarity; means for making said detector means operative upon provision of said first gate signal to provide a second signal; and means for collecting a signal resulting from the subtraction of said first signal from said second signal.

3. A receiver arrangement for automatic target tracking, monopulse radar systems, including means for receiving echoes of radar pulses, comprising: detector means for providing error signals indicative of the angular deviation of said target with respect to the pointing direction of said radar system; a reference channel locally providing a first target bound gate signal; means for locally providing a second gate-signal in fixed time relationship with said radar pulses; means for controlling the operation of said detector means by means of said first and second gate signals; and means for subtracting from each other said error signals provided by said detector means upon respective operation thereof by said first and second gate signals.

4. A receiver arrangement system for automatic target tracking, monopulse radar systems, including means for receiving signals, comprising: a reference channel for providing a reference signal; at least one difference channel for providing an error signal indicative of the angular deviation of said signal direction with respect to the pointing direction of the radar; a detector for detecting the phase of said error signal with respect to said reference signal, coupled to said difference channel, said detector having an output; a gate having an input coupled to said reference channel, an output coupled to said detector and two control inputs; sum channel for locally providing a first target bound gate signal; means for locally providing a second gate signal in predetermined time relationship with said radar pulses; means for applying said gate signals respectively to said gate control inputs for actuating said gate; means, coupled to said detector means, for storing with an opposite sign the voltage of said signals detected upon actuation of said gate by said second gate signals to provide stored signals; means for respectively subtracting said stored signals from said signals detected upon actuation of said gate by said first gate signals; and means for collecting the average resulting signal.

5. A receiver arrangement system for automatic target tracking, monopulse radar systems, including means for receiving signals, comprising: a reference channel for providing a reference signal; at least one difference channel for providing an error signal indicative of the angular deviation of said signal direction with respect to the pointing direction of the radar; a detector for detecting the phase of said error signals with respect to said reference signal, coupled to said difference channel, said detector having an output; a gate having an input coupled to said reference channel, an output coupled to said detector and two control inputs; sum channel for locally providing a first target bound gate signal; means for locally providing a second gate signal in predetermined time relationship with said radar pulse; means for applying said gate signals respectively to said gate control inputs for actuating said gate; a first cathode follower tube having a grid, coupled to said detector output, and an output; a second cathode follower having a grid and an output; a first capacitor coupled between said first cathode follower output and said second cathode follower grid; a first grounded switch coupled to said second cathode follower grid; means for closing said first switch for a short instant comprised within the duration of each error signal detected upon actuation of said gate by said second gate signal; a second capacitor; a second grounded switch coupled between said second capacitor and said second cathode follower output; means for closing said second switch for a short instant comprised within the duration of each error signal detected upon actuation of said gate by said first gate signal; and means coupled to said second capacitor for providing the average voltage of said second capacitor.

References Cited in the file of this patent
UNITED STATES PATENTS

| | | |
|---|---|---|
| 2,446,244 | Richmond | Aug. 3, 1948 |
| 2,464,258 | Prichard | Mar. 15, 1949 |
| 2,830,288 | Dicke | Apr. 8, 1958 |
| 2,950,474 | Page | Aug. 23, 1960 |